United States Patent
Lee

(10) Patent No.: US 9,232,599 B2
(45) Date of Patent: Jan. 5, 2016

(54) LIQUID CRYSTAL DISPLAY DEVICE

(71) Applicant: LG Display Co., Ltd., Seoul (KR)

(72) Inventor: Jae-Ho Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/509,237

(22) Filed: Oct. 8, 2014

(65) Prior Publication Data
US 2015/0102748 A1 Apr. 16, 2015

(30) Foreign Application Priority Data
Oct. 10, 2013 (KR) ........................ 10-2013-0120915

(51) Int. Cl.
| | |
|---|---|
| *G05F 1/00* | (2006.01) |
| *H05B 37/02* | (2006.01) |
| *H05B 39/04* | (2006.01) |
| *H05B 41/36* | (2006.01) |
| *H05B 33/08* | (2006.01) |
| *F21K 99/00* | (2010.01) |
| *G02F 1/1335* | (2006.01) |

(52) U.S. Cl.
CPC .............. *H05B 33/0854* (2013.01); *F21K 9/56* (2013.01); *G02F 1/133603* (2013.01); *G02F 1/133609* (2013.01); *G02F 1/133621* (2013.01); *G02F 2001/133612* (2013.01)

(58) Field of Classification Search
None
See application file for complete search history.

(56) References Cited

U.S. PATENT DOCUMENTS

| | | | |
|---|---|---|---|
| 7,906,041 B2 | 3/2011 | Li et al. | |
| 8,363,001 B2 | 1/2013 | Tanizoe et al. | |
| 2008/0309255 A1* | 12/2008 | Myers et al. | 315/297 |
| 2009/0180273 A1* | 7/2009 | Kim et al. | 362/84 |
| 2011/0115406 A1* | 5/2011 | Wang et al. | 315/294 |
| 2012/0306370 A1* | 12/2012 | Van De Ven et al. | 315/113 |

* cited by examiner

*Primary Examiner* — Anh Tran
(74) *Attorney, Agent, or Firm* — Morgan, Lewis & Bockius LLP

(57) ABSTRACT

A liquid crystal display device includes a backlight unit including an LED assembly, wherein the LED assembly includes: a plurality of LED packages; an LED PCB on which the plurality of LED packages are arranged being spaced apart from each other; and an LED driving circuit board that is connected to the LED PCB and includes a LED driving circuit, wherein the LED package includes first and second LED chips emitting two colors, respectively, out of red, green and blue, and a fluorescent substance emitting the other one color out of the red, green and blue, wherein a temperature sensor is formed in the LED PCB, and wherein the first or second LED chip is supplied with a compensated voltage according to temperature change by the temperature sensor.

5 Claims, 6 Drawing Sheets

LIQUID CRYSTAL DISPLAY DEVICE

The present application claims the priority benefit of Korean Patent Application No. 10-2013-0120915 filed in Republic of Korea on Oct. 10, 2013, which is hereby incorporated by reference in its entirety.

BACKGROUND OF THE INVENTION

1. Field of the Disclosure

The present disclosure relates to a liquid crystal display device (LCD), and more particularly, to an LCD which uses a light emitting diode (LED) and has excellent stability and color reproduction range for temperature change.

2. Discussion of the Prior Art

A liquid crystal display devices (LCDs), which has advantage in displaying moving images and high contrast ratio and is widely used for TV, monitor, or the like, displays images using optical anisotropy and polarization of liquid crystal.

The LCD uses a liquid crystal panel having two substrates facing each other and a liquid crystal layer therebetween as a main component, and alignment direction of liquid crystal molecules is changed by an electric field in the liquid crystal panel to realize difference of transmittance.

However, since the liquid crystal panel does not have a self-luminescent element and requires a light source, and to do this, a backlight unit having a light source is located below the liquid crystal panel.

The backlight unit is categorized into a direct type and an edge type according to arrangement structure of lamp.

The edge type backlight unit has a structure that at least one light source is located at one or both sides of a light guide plate. The direct type backlight unit has a structure that light sources are located below the liquid crystal panel.

The direct type backlight unit has a limit of thin profile and is thus mostly used for an LCD considering brightness as being more important than thickness. The edge type backlight unit is able to have a thin profile and is thus mostly used for an LCD, for a monitor of a laptop or desktop computer, considering thickness as being important.

Recently, a thin-profile LCD has been actively researched, and thus the edge type backlight unit has also been actively researched.

Particularly, an LED package is widely used as a light source of the edge type backlight unit because the LED package has advantages of a small size, a low power consumption and a high reliability.

FIG. 1 is a cross-sectional view illustrating an LCD including an edge type backlight unit using an LED package according to the prior art, FIG. 2 is a view illustrating an LED PCB having the LED package mounted thereon, FIG. 3 is a cross-sectional view illustrating an LED package according to the prior art, and FIG. 4 is a schematic block diagram of a driving circuit of the LED driving circuit board according to the prior art.

With reference to FIGS. 1 and 2, the LCD 1 includes a liquid crystal panel 10, a backlight unit 20, a main support 30, a bottom cover 50, and a top cover 40.

The liquid crystal panel 10 includes first and second substrates 12 and 14 attached to each other with a liquid crystal layer therebetween. Polarizing plates 19a and 19b are located on outer surfaces of the first and second substrates 12 and 14, respectively.

The backlight unit 20 is below the liquid crystal panel 10.

The backlight unit 20 includes an LED assembly 70 including an LED PCB (printed circuit board) 75 and LED packages 72 mounted on the LED PCB 75, a reflection plate 25 on the bottom cover 50, a light guide plate 23 on the bottom cover 50, and a plurality of optical sheets 21 on the light guide plate 23.

The liquid crystal panel 10 and the backlight unit 20 are surrounded by the main support 30 of a rectangular frame shape and coupled with the top cover 40 and the bottom cover 50, and thus the LCD 1 is manufactured.

A LED driving circuit board 79 to drive the LED package 72 is located below the bottom cover 50, and is electrically connected to the LED PCB 75 through a wiring. To protect the LED driving circuit board 79, a protection cover 90 is located corresponding to the LED driving circuit board 79.

In the LED assembly 70, the LED packages 72 are mounted on the LED PCB 75 being spaced apart from each other and function as light sources.

With reference to FIG. 3, the LED package 72 includes three LED chips 74a, 74b and 74c emitting red (R), green (G) and blue (B), respectively, a lead frame 76 having the LED chips 74a, 74b and 74c mounted thereon, a package housing 77 that has a partition wall on the lead frame 76 and reflects lights emitted from the LED chips 74a, 74b and 74c, and a transparent organic layer 78 filling a space surrounded by the package housing 77.

Accordingly, the LED package 72 including the three LED chips 74a, 74b and 74c finally emits a white light W through the mixture of red, green and blue lights. The white light W enters the light guide plate 23 through a light incidence surface of the light guide plate 23, then is refracted toward the liquid crystal panel 10, then is processed along with a light reflected by the reflection plate 25 into a high quality plane light while passing through the optical sheets 21, and then is supplied to the liquid crystal panel 10.

The LED driving circuit board 78 includes a driving circuit to drive the LED package 72.

With reference to FIG. 4, the driving circuit of the LED driving circuit board 78 includes a DC-DC block E1 to supply DC powers independently to the red, green and blue LED chips 74a, 74b and 74c, a PWM (pulse width modulation) control IC (integrated circuit) E2 to control the output currents of the DC-DC block E1, and a color controller E3.

The driving circuit is connected to the red, green and blue LED chips 74a, 74b and 74c through the LED PCB 76, and is also connected to a color sensor 84.

The color controller E3 senses a color coordinate of the white light emitted from the LED package 72, and calculates an error with respect to a target color coordinate and an output compensation amount, and transfers the output compensation amount to the PWM control IC E2.

Employing the color sensor 84 and the color controller E3 in the prior art LCD 1 is for preventing change of a color temperature of a white light that is caused as times go on because the red, green and blue LED chips 74a, 74b and 74c have different temperature properties.

Further, each LED package 72 has the red, green and blue LED chips 74a, 74b and 74c therein, and the LED chips are independently driven. With reference to FIG. 5 that is a graph illustrating light intensities of the red, green and blue LED chips according to temperature rise, it is shown that the red, green and blue LED chips 74a, 74b and 74c have different light intensities according to temperature rise, and this means the red, green and blue LED chips 74a, 74b and 74c have different dependences on temperature.

Accordingly, considering the different dependences on temperature among the LED chips 74a, 74b and 74c, in order that a constant white light without change on a color coordinate is to be emitted even though temperature is changed, the color controller E3 is required to have a complicated circuit configuration.

In other words, the color sensor 84 measures in real time a color change of the white light emitted from each LED package 72, and more precisely, changes of red, green and blue emitted from the respective LED chips 74a, 74b and 74c, and the color controller E3 compares a target color coordinate of a white light that is a mixture form of red, green and blue with a color information value measured by the color sensor 84, and calculates a difference between the target value and the measured value.

The color controller E3 calculates an output compensation value of the PWM control IC E2 to offset the difference between the target value and the measured value, and transfers the compensation value to the PWM control IC, then the PWM control IC E2 transfers the output compensation value to the DC-DC block E1, and then the DC-DC block E1 applies current values corresponding to the difference between the target value and the measured value to the red, green and blue LED chips 74a, 74b and 74c, respectively. Accordingly, even though change of temperature happens, a white light of a constant color coordinate can be achieved.

Accordingly, since the color control for change of color coordinate is required to be always conducted for each of red, green and blue, configuration of the LED driving circuit of the LED driving circuit board 79 is very complicated. Further, since the three LED chips 74a, 74b and 74c emitting red, green and blue lights, respectively, are all mounted in each LED package 72, and the color sensor 84 measuring the intensity change of the red, green and blue lights is necessarily required, a production cost of the LCD 1 increases.

SUMMARY OF THE INVENTION

Accordingly, the present invention is directed to a liquid crystal display (LCD) that substantially obviates one or more of the problems due to limitations and disadvantages of the related art.

An object of the present invention is to provide an LCD that can suppress color temperature change of white light due to temperature change, reduce a production cost by simplification of a LED driving circuit, and have excellent color reproduction range.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a backlight unit including an LED assembly, wherein the LED assembly includes: a plurality of LED packages; an LED PCB on which the plurality of LED packages are arranged being spaced apart from each other; and an LED driving circuit board that is connected to the LED PCB and includes a LED driving circuit, wherein the LED package includes first and second LED chips emitting two colors, respectively, out of red, green and blue, and a fluorescent substance emitting the other one color out of the red, green and blue, wherein a temperature sensor is formed in the LED PCB, and wherein the first or second LED chip is supplied with a compensated voltage according to temperature change by the temperature sensor.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to exemplary embodiments, examples of which are illustrated in the accompanying drawings.

Figure 6:
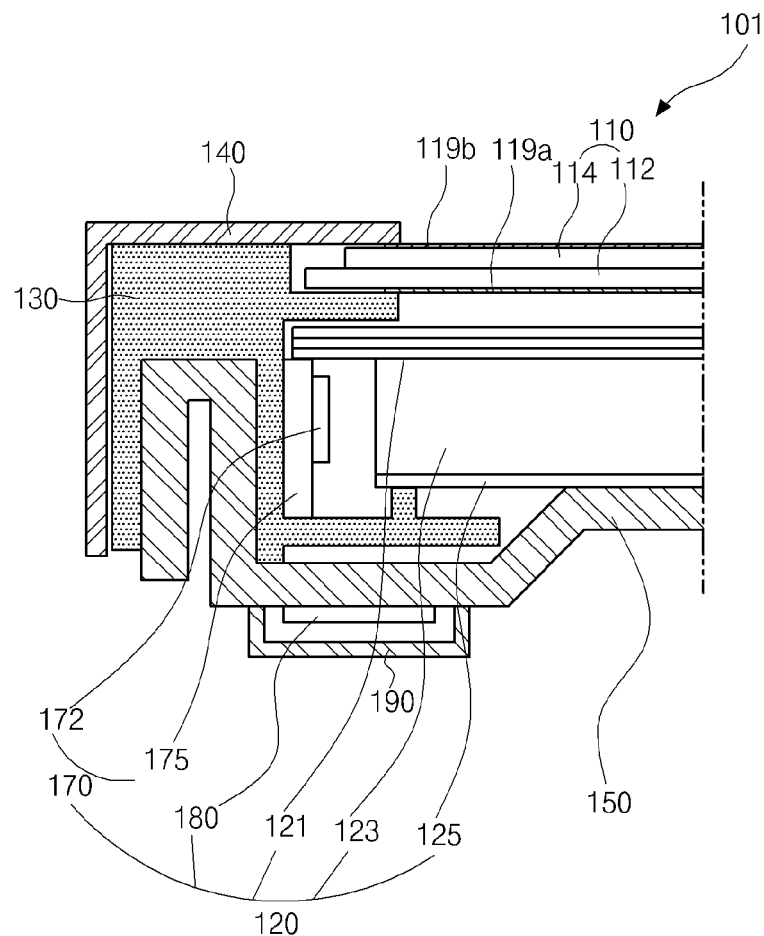
FIG. 6 is a cross-sectional view illustrating an LCD according to an embodiment of the present invention.
Figure 7:
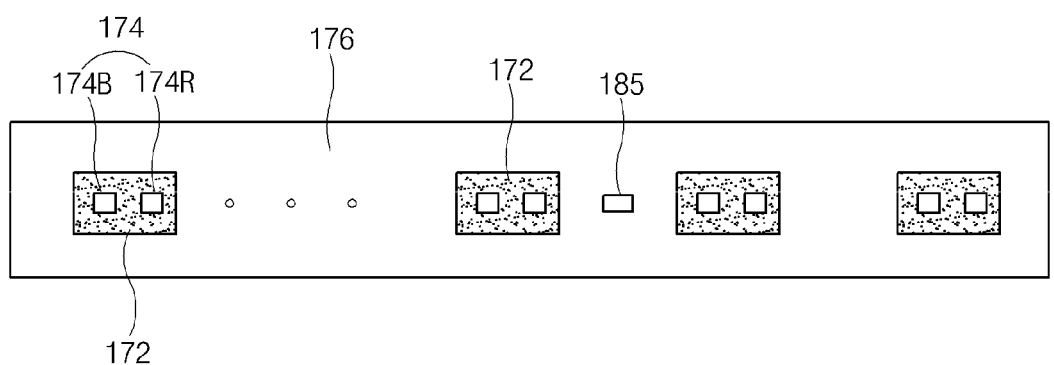
FIG. 7 is a view illustrating an LED PCB of the LCD according to an embodiment of the present invention.
Figure 8:
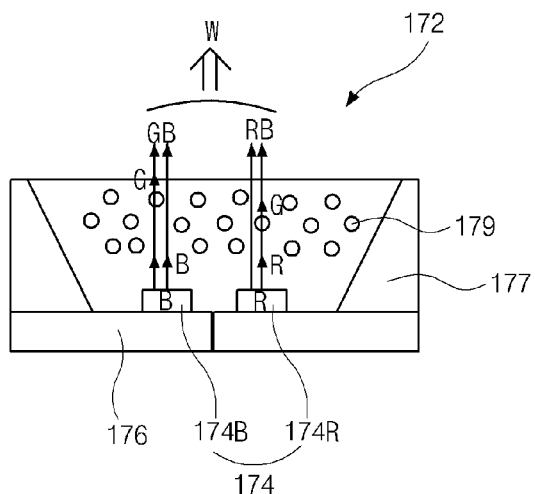
FIG. 8 is a cross-sectional view illustrating an LED package according to an embodiment of the present invention.

FIG. 6 is a cross-sectional view illustrating an LCD according to an embodiment of the present invention, FIG. 7 is a view illustrating an LED PCB of the LCD according to an embodiment of the present invention, and FIG. 8 is a cross-sectional view illustrating an LED package according to an embodiment of the present invention.

With reference to FIGS. 6 and 7, the LCD 101 includes a liquid crystal panel 110, a backlight unit 120, a main support 130, a bottom cover 150, a top cover 140, an LED driving circuit board 179, and a protection cover 190.

The liquid crystal panel 110 includes first and second substrates 112 and 114, and a liquid crystal layer between the first and second substrates 112 and 114.

The first substrate 112 may be referred to as a lower substrate or array substrate. A plurality of gate lines and a plurality of data lines cross each other on an inner surface of the first substrate 112 to define a plurality of pixel regions in a matrix form.

A thin film transistor is formed in each pixel region and connected to the corresponding gate and data lines. A pixel electrode is formed in each pixel region and connected to the thin film transistor.

The second substrate 114 facing the first substrate 112 may be referred to as an upper substrate or color filter substrate. A color filter layer including red, green and blue color filter patterns corresponding to the respective pixel regions is formed on an inner surface of the second substrate 114. A black matrix surrounds each color filter pattern and corresponds to the gate line, the data line, and the thin film transistor.

A common electrode covers the color filter layer and the black matrix.

The liquid crystal panel 110 as above is an example in a TN (twisted nematic) mode.

However, the liquid crystal panel may have other configuration. For example, the common electrode may be formed on the first substrate 112 along with the pixel electrode. In other words, the common electrode may be formed at the same layer as the pixel electrode and alternate with the pixel electrode in the pixel region, and in this case, the liquid crystal panel is driven in an in-plane switching mode.

Alternatively, the common electrode may be formed on the first substrate and overlap the pixel electrode with an insulating layer therebetween. In this case, one of the common electrode and the pixel electrode that is located over the other one of the common electrode and the pixel electrode has a plurality of openings, and the liquid crystal panel having this configuration is driven in a fringe field switching mode.

First and second polarizing plates 119a and 119b are attached onto outer surfaces of the first and second substrates 112 and 114, respectively.

A PCB is connected to at least one sides of the liquid crystal panel 110 through a connection means such as a FPCB (flexible printed circuit board) or TCP (tape carrier package). In a modulization process, by bending the connection means, the PCB is located on a side surface of the main support 130 or a bottom surface of the bottom cover 150.

When the gate lines are sequentially selected by a gate driving circuit, a thin film transistor connected to the selected gate line is turned on by a gate signal, then a data voltage output from a data driving circuit is transferred to the pixel electrode through the data line and the thin film transistor, and then alignment direction of liquid crystal molecules is changed by an electric field induced between the pixel electrode and the common electrode.

The backlight unit 120 includes an LED assembly 170, a reflection plate 125 in white or silver color, a light guide plate 123 on the reflection plate 125, a plurality of optical sheets 121 on the light guide plate 123, and the LED driving circuit board 180 connected to an LED PCB 175.

The LED assembly 170 is located at a side of the light guide plate 123 facing a light incidence surface of the light guide plate 123. The LED assembly 170 includes a plurality of LED packages 172, and the LED PCB 175 on which the LED packages 172 spaced part from each other are mounted on. Further, at least one temperature sensor 185 is formed on the LED PCB 175 and located at a separate region between the LED packages 172.

The LED assembly 170 includes the LED driving circuit board 180 mounted on the bottom surface of the bottom cover 150.

The LED assembly 170 is a top view type in which lights emitted from the LED packages 172 are perpendicular to a plane of the LED PCB 175.

With reference to FIG. 8, each LED package 172 includes red and blue LED chips 174R and 174B without a green LED chip in order to improve light emission efficiency and brightness property and reduce production cost.

In other words, in each LED package 172, the red LED chip 174R and the blue LED chip 174B are mounted on a lead frame 176 being spaced apart from each other, and an LED housing 177 includes partition walls and surrounds the red LED chip 174R and the blue LED chip 174B. Further, in order to emit a white light, a green fluorescent substance 179 generating a green fluorescent light is formed on the red and blue LED chips 174R and 174B and fills a space surrounded by the partition walls of the LED housing 177.

Alternatively, in each LED package 172, other LED chips emitting two colors out of red, green and blue, for example, a blue LED chip and a green LED chip are formed, and a fluorescent substance emitting the other one color out of red, green and blue, for example, a red fluorescent substance is formed.

Figure 5:
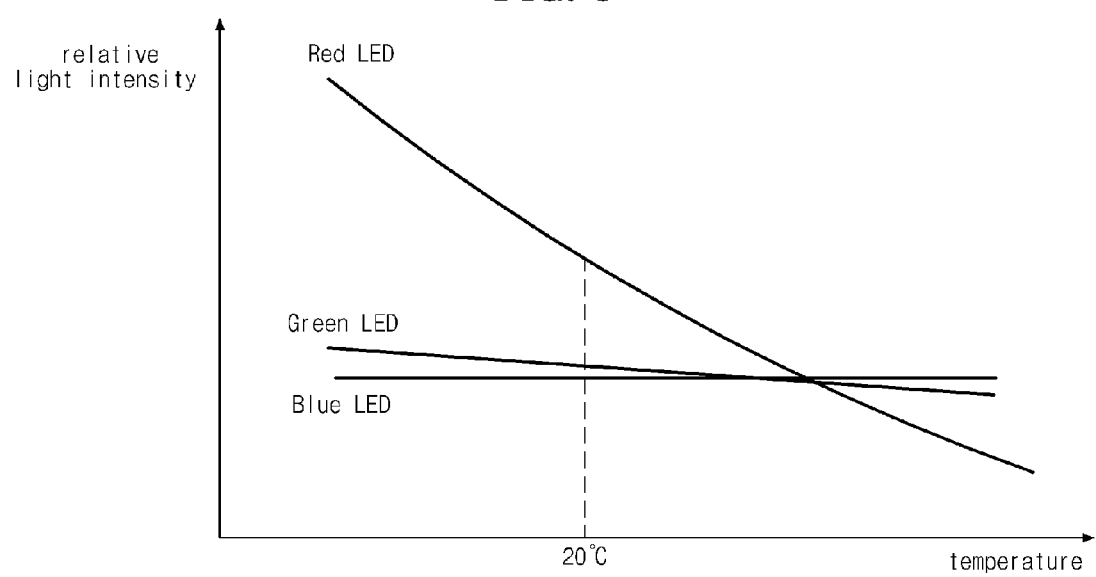
FIG. 5 is a graph illustrating light intensities of red, green and blue LED chips according to temperature rise.

With reference to FIG. 5, a blue LED chip is hardly influenced by temperature change, and a red LED chip is in most sensitive to temperature change and has great change of light intensity.

Accordingly, in the case that the blue LED chip 174B, which hardly depends on temperature change, out of the red, green and blue LED chips, and one LED chip out of the red and green LED chips are installed in the LED package 172, and a fluorescent substance is formed to emit the remaining color not selected for the LED chips is formed, when sensing and compensating for change of light intensity due to temperature dependence is conducted for one of the red LED and the green LED except for the blue LED chip, a white light can be stably obtained in temperature change. This is because a fluorescent substance is hardly problematic in temperature dependence.

However, in the case that the LED package includes the blue and green LED chips, and the red fluorescent substance, the temperature dependence i.e., the color temperature change according to temperature change is improved compared with the prior art, but it is shown experimentally that this case has a color reproduction range reduced.

Accordingly, it is more preferable that the LED package 172 is configured to include the red and blue LED chips 174R and 174B, and the green fluorescent substance 179, as shown in FIGS. 6 to 8, considering suppression of color temperature change according to temperature change and high color reproduction range.

As described above, since the green is emitted from the fluorescent substance 179, a property of the green fluorescent substrate itself is an important factor.

When a single color fluorescent substance makes an emission, a full width at half maximum (FWHM) is an important factor regarding a property of a color range reproduction range. The FWHM is a width at half maximum value (i.e., half peak value) of a wavelength profile of an emitted light.

Figure 9:
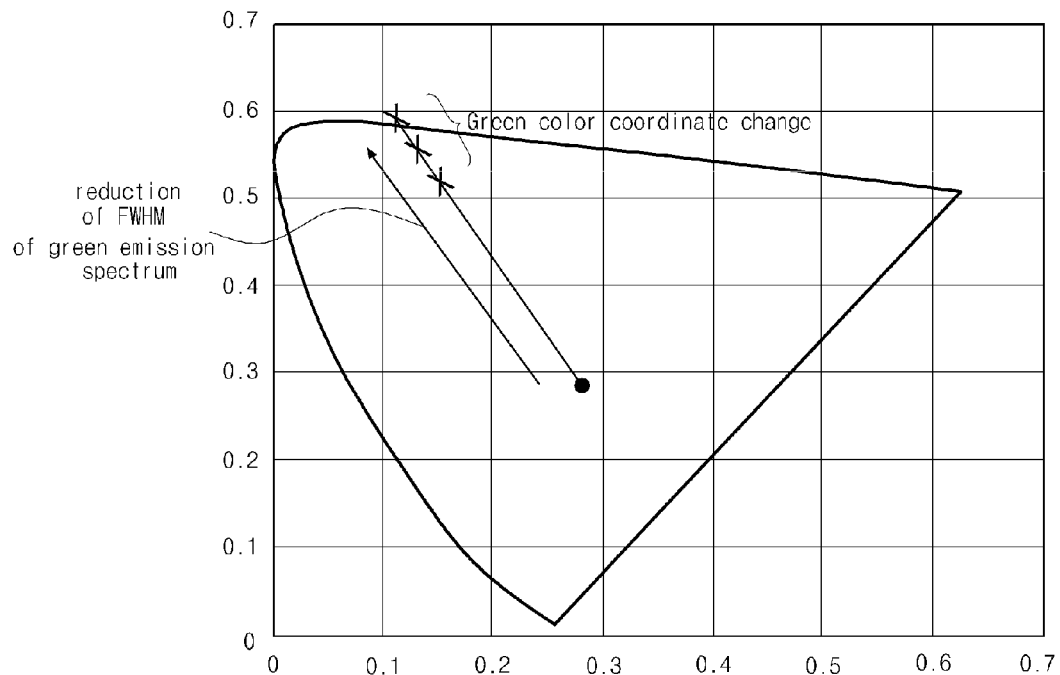
FIG. 9 is a graph illustrating a property of a green fluorescent substance on a color coordinate system.

With reference to FIG. 9 which is a graph illustrating a property of a green fluorescent substance on a color coordinate system (X-Y coordinate system), as a green peak wavelength Wp increases, a green coordinate point moves right on the color coordinate system, and as the FWHM decreases, a green coordinate point moves to a direction that becomes deeper from an white origin point Accordingly, it is shown that the FWHM of the green fluorescent substance 179 is preferably 70 nm or less to obtain a green coordinate point meeting display international color standards, for example, NTSC, BT709, DCI, and Adobe RGB Since the red and blue LED chips 174R and 174B are driven independently, the properties of the red and blue LED chips 174R and 174B behave equally according to temperature change to maintain a constant color.

Accordingly, if an light output compensation of the LED chips 174R and 174B according to temperature change is not conducted, since the red and blue LED chips 174R and 174B have different properties according to temperature change, a change amount of a white light on a color coordinate according temperature rise of each of the LED chips 174R and 174B, thus a color temperature of a white light decreases as a temperature increases with respect to a room temperature (normally 20 degrees Celsius to 25 degrees Celsius), and thus a uniform white light is not obtained.

A light emission property of the green fluorescent substance pumped by light energies of the blue LED chip 174B and the red LED chip 174R has a temperature dependence much less than the red LED chip 174R and is thus negligible.

Accordingly, in the LCD package 172 of the embodiment, when the temperature dependence of the red LED chip 174R is compensated for, uniformity of white light can be obtained regardless of temperature change.

With reference to FIG. 5, the red LED chip 174R has a temperature dependence such that an red light output from the red LED chip 174R changes to be reduced approximately proportional to increase of temperature. Accordingly, using the temperature sensor 185 of an LED sensing portion, for example, a thermistor, the output of the red LED chip 174R can be compensated for through a resistance value of the thermistor that changes according to temperature change.

For example, the output compensation is made such that a driving current of the red LED chip 174R has a greater value as a measured temperature is higher.

Accordingly, in the LCD 101 of the embodiment, since the LED package 172 uses the blue and red LED chips 174R and 174B, by sensing and compensating for change of light intensity of the red LED chip 174R, a constant white light corresponding to a target coordinate value on a color coordinate system can be obtained. Thus, without using the relatively expensive color sensor of the prior art sensing color change of red, green and blue, the relatively cheap temperature sensor sensing temperature change can be used, and thus compensation of light intensity of the red LED chip 174R according to temperature change is conducted.

The temperature sensor 185 is preferably located on the LED PCB 175 having the LED package 172 mounted thereon. This is because the temperature sensor 185 is located adjacent to the LED package 172 and more exactly senses temperature change of the LED package 172.

Figure 10:
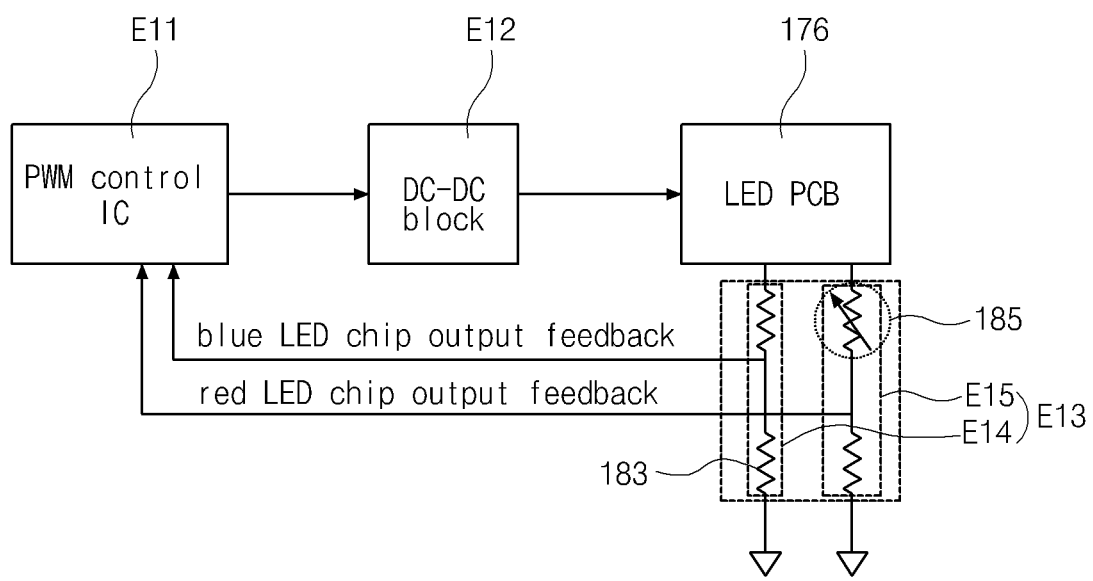
FIG. 10 is a schematic view of a LED driving circuit of the LED driving circuit board 180 according to an embodiment of the present invention.

In the case that the temperature sensor 185 is used instead of the relatively expensive color sensor of the prior art, with reference to FIG. 10 which is a schematic view of a LED driving circuit of the LED driving circuit board 180 according to the embodiment of the present invention, the LED driving circuit is also simplified.

Figure 1:
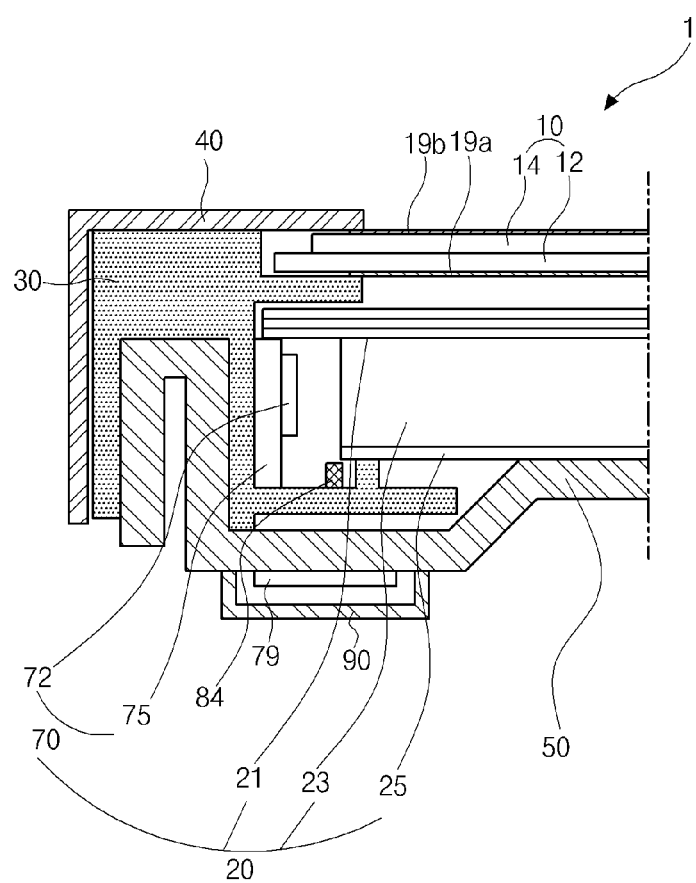
FIG. 1 is a cross-sectional view illustrating an LCD including an edge type backlight unit using an LED package according to the prior art.
Figure 2:
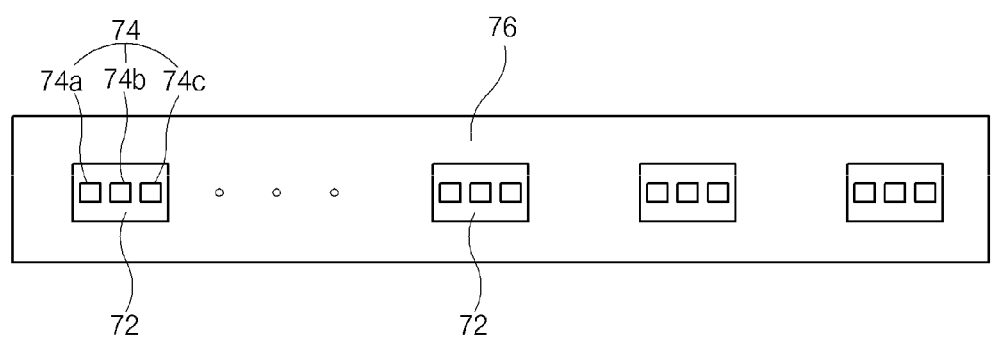
FIG. 2 is a view illustrating an LED PCB having the LED package mounted thereon.
Figure 3:
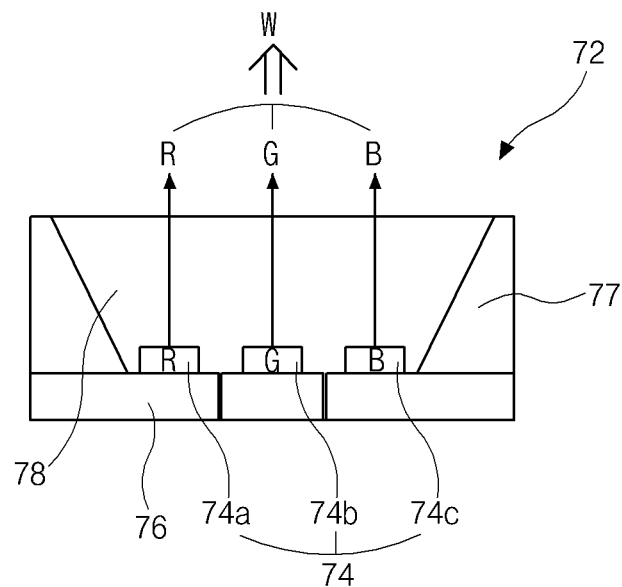
FIG. 3 is a cross-sectional view illustrating an LED package according to the prior art.
Figure 4:
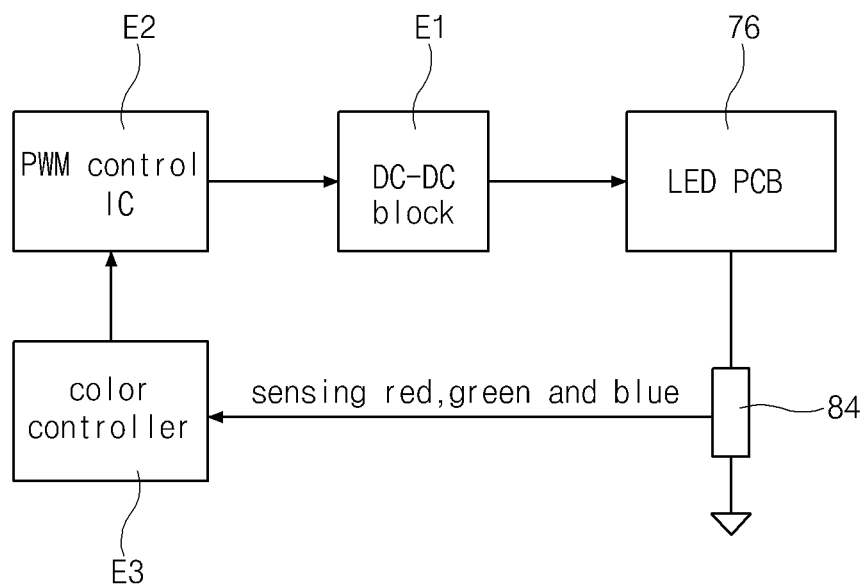
FIG. 4 is a schematic block diagram of a driving circuit of the LED driving circuit board according to the prior art.

In the prior art LCD, since light intensity change due to temperature change generated from the red, green and blue LED chips (74a, 74b and 74c of FIG. 3) is sensed using the color sensor (84 of FIG. 1) and is compensated for with respect to the target value, the LED driving circuit of FIG. 4 needs the controller (E3 of FIG. 4) additionally.

However, in the LCD 101 of the embodiment, compensation of the red LCD chip 174R suffices because of property of the LED package 172 itself. Accordingly, instead of the controller (E3 of FIG. 4) having a complicated circuit configuration, a variable resistor as the temperature sensor 185 is formed particularly in an LED output sensing portion E13, and a resistance value is varied reflecting light intensity change according to temperature change of the red LED chip 174R itself by the temperature sensor 185 sensing temperature change, and an output voltage of the red LED chip 174R is fed back to a PWM control IC E11 through the temperature sensor 185. Thus, a white light having a constant color coordinate for temperature change can be emitted from each LED package 172.

Accordingly, the LED driving circuit of the LED driving circuit board 180 can be configured to include the PWM control IC E11, a DC-DC block E12, the LED output sensing portion E13, and the temperature sensor 185 connected to the LED output sensing portion E13. Thus, the LED driving circuit is simpler than that of the prior art, and thus production cost of the LED driving circuit can be reduced.

The temperature sensor 185 is a thermistor, which is a resistor linearly varied according to temperature.

A blue LED sensing portion E14 of the LED output sensing portion E13 is connected directly to the PWM control IC E11 without the temperature sensor 185 while the red LED chip sensing portion E15 is connected to the temperature sensor 185.

This is because the blue LED chip 174B has a very little temperature dependence due to property its own property, blue light intensity is hardly influenced by temperature change, and compensation regarding temperature change is not needed.

Function and operation of the components of the LED driving circuit are explained as follows.

The DC-DC block E12 functions to supply DC powers to the red and blue LED chips 174R and 174B independently, and the PWM control IC E11 functions to control an output current of the DC-DC block E12.

The LED output sensing portion E13 functions to sense output currents from the red and blue LED chips 174R and 174B, and includes a plurality of resistors 183.

Regarding the operation of the LED driving circuit, a reference voltage Vref to determine a width of a PWM output signal in the PWM control IC E11 is compared with an output sensing voltage of the red and blue LED chips 174R and 174B, and the width of the PWM output signal is determined proportional to a difference value between the reference voltage Vref and the output sensing voltage. The output current to each of the LED chips 174R and 174B from the DC-DC block E12 is determined.

Since the blue LED chip 174B has a very little temperature dependence, the output current value to the blue LED chip 174B is substantially constant. However, regarding the red LED chip 174R, since the temperature sensor, for example, the themistor is connected to an output feedback resistance circuit, a voltage level of the output feedback signal of the red LED chip 174R is automatically varied according to temperature change, and thus the output of the red LED chip 174R according to temperature change can be compensated for.

Accordingly, a compensation circuit according to temperature change is applied for the output current of the red LED chip 174R, thus change amount of a color coordinate according to temperature change is constant maintained, and thus a white light finally emitted can be maintained in constant color.

With reference to FIG. 6, the reflection plate 125 is located below the light guide plate 123 and reflects light coming out from the bottom surface of the light guide plate 123 toward the liquid crystal panel 110, and thus brightness of light can be improved.

The light guide plate 123 may be made of a transparent material, for example, an acryl based transparent resin such as polymethylmethacrylate (PMMA), or a polycarbonate (PC) based material and is formed in a flat type.

The light guide plate 123 may have a specific pattern on a bottom surface thereof to supply a uniform plane light, and the pattern may be various, for example, an elliptical pattern, polygon pattern, hologram pattern, or the like.

The optical sheets 121 may have a diffusion sheet and at least one concentration sheets, and functions to diffuse and/or concentrate light from the light guide plate 123 and supply more uniform plane light to the liquid crystal panel 110.

The liquid crystal panel 110 and the backlight unit 120 are modulized using the top cover 140, the main support 130, and the bottom cover 150.

The top cover 140 has a rectangular frame shape, which is bent in cross-section, and covers edge portions of the liquid crystal panel 110. The top cover 140 shields a non-display region of the liquid crystal panel 110 and has an opening corresponding to a display region of the liquid crystal panel 110 to display images from the liquid crystal panel 110.

The bottom cover 150 includes a horizontal surface close to a bottom surface of the backlight unit 120, and a side surface bent from the horizontal surface. The liquid crystal panel 110 and the backlight unit 120 are placed on the bottom cover 150.

The main support 130 surrounds sides of the liquid crystal panel 110 and the backlight unit 120 and has a rectangular frame shape. The main supporter 130 is coupled with the top cover 140 and the bottom cover 150.

The top cover 140 may be referred to as a case top or top case, the main support 130 may be referred to as a support main, a guide panel, or mold frame, and the bottom cover 150 may be referred to as a cover bottom, or lower cover.

The LED driving circuit board 180 is located below the bottom cover 150 and is connected to the LED PCB 175 through a wiring. The LED driving circuit board 180 includes the LED driving circuit to drive the red and blue LED chips 174R and 174B independently. The protection cover 190 covers the LED driving circuit board 180 to protect the LED driving circuit board 180.

As described above, in the LCD 101 of the embodiment, the LED packages 172 formed on the LED PCB 175 is configured to have the two LED chips i.e., the red and blue LED chips 174R and 174B installed therein, and the green fluorescent substance 179, and the temperature sensor 185 is formed close to the LED package 172. By sensing a heat of the LED package 172 and applying a compensated voltage according to temperature change to the red LED chip 174R sensitive to temperature change, even though temperature change happens, a white light having a constant color property is obtained, and thus high display quality and high color reproduction range can be achieved.

Further, the LED driving circuit formed in the LED driving circuit board 180 is simpler and does not need a color sensor and a color controller, and the red and blue LED chips 174R and 174B suffice in each LED package 172. Thus, production cost can be reduced compared with the prior art using the red, green and blue LED chips in each LED package.

It will be apparent to those skilled in the art that various modifications and variations can be made in a display device of the present disclosure without departing from the sprit or scope of the invention. Thus, it is intended that the present invention covers the modifications and variations of this invention provided they come within the scope of the appended claims and their equivalents.

What is claimed is:
1. A liquid crystal display device, comprising:
a backlight unit including an LED assembly,
wherein the LED assembly includes:
a plurality of LED packages;
an LED PCB on which the plurality of LED packages are arranged being spaced apart from each other; and
an LED driving circuit board that is connected to the LED PCB and includes a LED driving circuit,
wherein the LED package includes first and second LED chips emitting two colors, respectively, out of red, green and blue, and a fluorescent substance emitting the other one color out of the red, green and blue,
wherein a temperature sensor is formed in the LED PCB,
wherein the first or second LED chip is supplied with a compensated voltage according to temperature change by the temperature sensor,
wherein the first LED chips emits the blue, the second LED chip emits the red, and the fluorescent substance emits the green,
wherein the LED driving circuit includes a PWM control IC, a DC-DC block, and an LED sensing portion,
wherein the LED sensing portion includes first and second LED sensing portions that each include a plurality of resistors, and are connected to the first and second LED chips, respectively,
wherein the temperature sensor is connected to the second LED sensing portion,
wherein the DC-DC block supplies DC powers to the first and second LED chips independently,
wherein the PWM control IC controls an output current of the DC-DC block, and
wherein the LED sensing portion feeds output voltages of the first and second LED chips back to the PWM control IC,
wherein the output voltage of the second LED chip is fed back to the PWM control IC through the temperature sensor, and
wherein the output voltage of the first LED chip is fed back to the PWM control IC without the temperature sensor.
2. The device of claim 1, wherein a full width at half maximum (FWHM) of light emission of the fluorescent substance is about 70 nm or less.
3. The device of claim 1, wherein the second LED sensing portion includes the plurality of resistors and the temperature sensor, and
wherein a resistance value of the temperature sensor varies proportional to a temperature.
4. The device of claim 1, wherein a resistance value of the temperature sensor is varied proportional to temperature change of the first or second LED chip.
5. The device of claim 4, wherein a driving voltage supplied to the first or second LED chip rises as a measured temperature value of the temperature sensor is higher.

* * * * *